United States Patent
Abrahams

(10) Patent No.: US 6,168,243 B1
(45) Date of Patent: Jan. 2, 2001

(54) HUBCAP PROTECTIVE DEVICE

(76) Inventor: Paul McWhinnie Abrahams, 227-07 135th Ave., Laurelton, NY (US) 11413

( * ) Notice: Under 35 U.S.C. 154(b), the term of this patent shall be extended for 0 days.

(21) Appl. No.: 09/217,512

(22) Filed: Dec. 21, 1998

(51) Int. Cl.[7] ............................... B60B 7/16; B60B 7/00; F16B 41/00
(52) U.S. Cl. ..................... 301/37.21; 301/37.1; 411/910
(58) Field of Search ................. 301/37.1, 37.21; 70/225, 229; 411/910, 919, 403, 404, 402

(56) References Cited

U.S. PATENT DOCUMENTS

| | | | |
|---|---|---|---|
| 2,695,195 | * 11/1954 | O'Day | 301/37.21 |
| 3,336,771 | 8/1967 | Selleck . | |
| 4,116,490 | * 9/1978 | Huff et al. | 301/37.21 |
| 4,171,851 | * 10/1979 | Scruggs | 301/37.21 |
| 4,480,513 | * 11/1984 | McCauley et al. | 411/403 |
| 4,618,299 | * 10/1986 | Bainbridge et al. | 411/403 |
| 4,869,084 | 9/1989 | Mack, Jr. . | |
| 4,969,342 | 11/1990 | Marchiori . | |
| 5,011,231 | * 4/1991 | Weber | 301/37.21 |
| 5,018,794 | * 5/1991 | Oliver | 301/37.21 |
| 5,199,287 | 4/1993 | McClary . | |
| 5,370,486 | * 12/1994 | Plummer | 411/403 |

* cited by examiner

*Primary Examiner*—S. Joseph Morano
*Assistant Examiner*—Jason R. Bellinger
(74) *Attorney, Agent, or Firm*—Michael I Kroll

(57) ABSTRACT

The present invention 10 discloses a wheel cover locking device which includes a flexible cable 18 having one end attached to the wheel cover 12 of a car 14 and the other end of the cable 18 attached to and around the wheel lug 24 of the wheel 30 of the car 14. The end of the cable which is attached to the wheel lug 24 includes an annular fitting 20 for being bolted onto the lug bolt 24 by the lug nut 22. The other end of the cable 18 passes through and is attached to the wheel cover 12 by means 16 which secure it to the hubcap. This prevents the wheel cover 12 from being removed from the car 14 without totally destroying the wheel cover 12 or, at the minimum, making a large and noticeable hole in the wheel cover 12 which would detract from its street value and thereby discourage theft of the wheel cover 12.

5 Claims, 5 Drawing Sheets

HUBCAP PROTECTIVE DEVICE

BACKGROUND OF THE INVENTION

1. Field of the Invention

The present invention relates generally to wheel cover protective devices and, more particularly, to a cable having annular means on one distal end for attachment to a lug nut and a cap on the other distal end which is attached to the cable after inserting said cable through an opening in the wheel cover and a locking c ring attached to the cable on the other side to keep the wheel cover firmly attached to the distal end of the cable.

2. Description of the Prior Art

There are other hubcap locking devices designed to prevent removal or loss of a hubcap. Typical of these is U.S. Pat. No. 3,336,771 issued to Selleck on Aug. 22, 1967.

Another patent was issued to Mack, Jr. on Sept. 26, 1989 as U.S. Pat. No. 4,869,084. Yet another U.S. Pat. No. 4,969,342 was issued to Marchiori on Nov. 13, 1990 and still yet another was issued on Apr. 6, 1993 to McClary as U.S. Pat. No. 5,199,287.

While these hubcap locking devices may be suitable for the purposes for which they were designed, they would not be as suitable for the purposes of the present invention, as hereinafter described.

SUMMARY OF THE PRESENT INVENTION

The present invention discloses a wheel cover locking device which includes a flexible cable having one end attached to the wheel cover of a car and the other end of the cable attached to and around the wheel lug of the wheel of the car. The end of the cable which is attached to the wheel lug includes an annular fitting for being bolted onto the lug bolt by the lug nut. The other end of the cable passes through and is attached to the wheel cover by means which secure it to the hubcap. This prevents the wheel cover from being removed from the car without totally destroying the wheel cover or, at the minimum, making a large and noticeable hole in the wheel cover which would detract from its street value and thereby discourage theft of the wheel cover.

A primary object of the present invention is to provide a hubcap locking device to prevent the loss or theft of said hubcap.

Another object of the present invention is to provide a hubcap locking device having a fitting which attaches annularly to a lug nut.

Yet another object of the present invention is to provide a hubcap locking device having a cable which prevents the hubcap from being removed from the vehicle by means of theft or accident.

Still yet another object of the present invention is to provide a hubcap locking device having a cable which attaches to the lug nut annular fitting.

Another object of the present invention is to provide a hubcap locking device having a cable which passes through a small opening in the exterior surface of the hubcap having a small cap-like fitting to maintain the position of the cable to the outside of the hubcap. Yet another attachment is made to the annular fitting located underneath the lug nut.

Yet another object of the present invention is to provide a hubcap locking device having a locking c ring attached on the opposite side of the hubcap to keep the cable from traveling through the hubcap opening.

Additional objects of the present invention will appear as the description proceeds.

The present invention overcomes the shortcomings of the prior art by providing a means for locking the hubcap to the lug nut of the wheel to prevent loss by means of accident or theft.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

DESCRIPTION OF THE PREFERRED EMBODIMENT(S)

Figure 1:
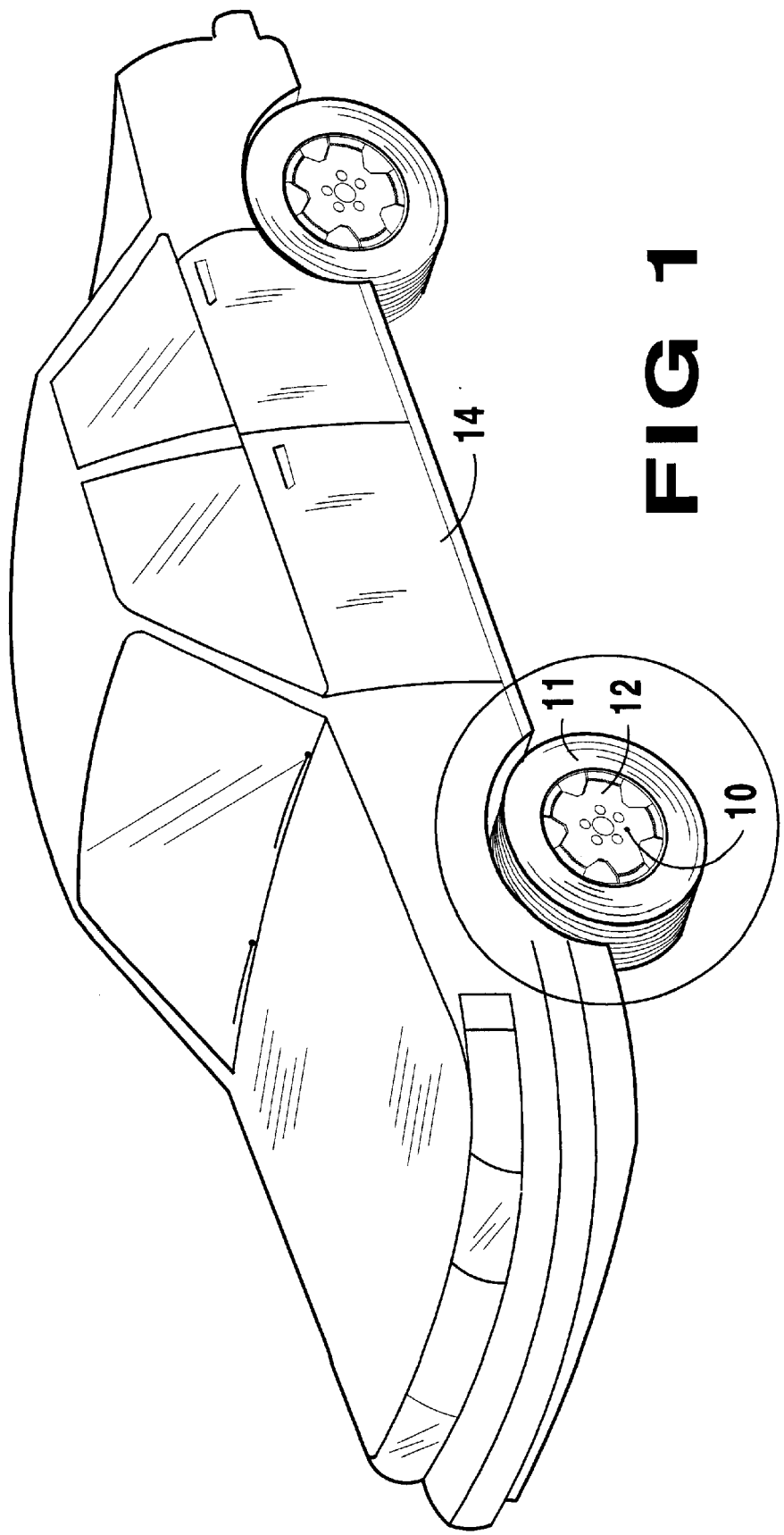
FIG. 1 is a perspective view of the present invention in use whereby the hubcap has been secured to the car by the hubcap locking device.

Turning now descriptively to the drawings, in which similar reference characters denote similar elements throughout the several views, FIGS. 1 through 5 illustrate the present invention being a hubcap locking device. With regard to the reference numerals used, the following numbering is used throughout the various drawings.

10 present invention
11 tire
12 hubcap
14 car
16 hubcap fitting
18 cable
20 annular lug nut attachment
22 lug nut
24 lug bolt
26 opening in hubcap
28 friction fitting
30 wheel
32 means for attachment
34 locking lug nut Turning to FIG. 1, therein is shown a perspective view of the present invention 10 in use whereby a wheel cover or hubcap 12 is detachably secured to a car 14 using the hubcap locking device of the present invention. The tire 11 is also shown.

Figure 2:
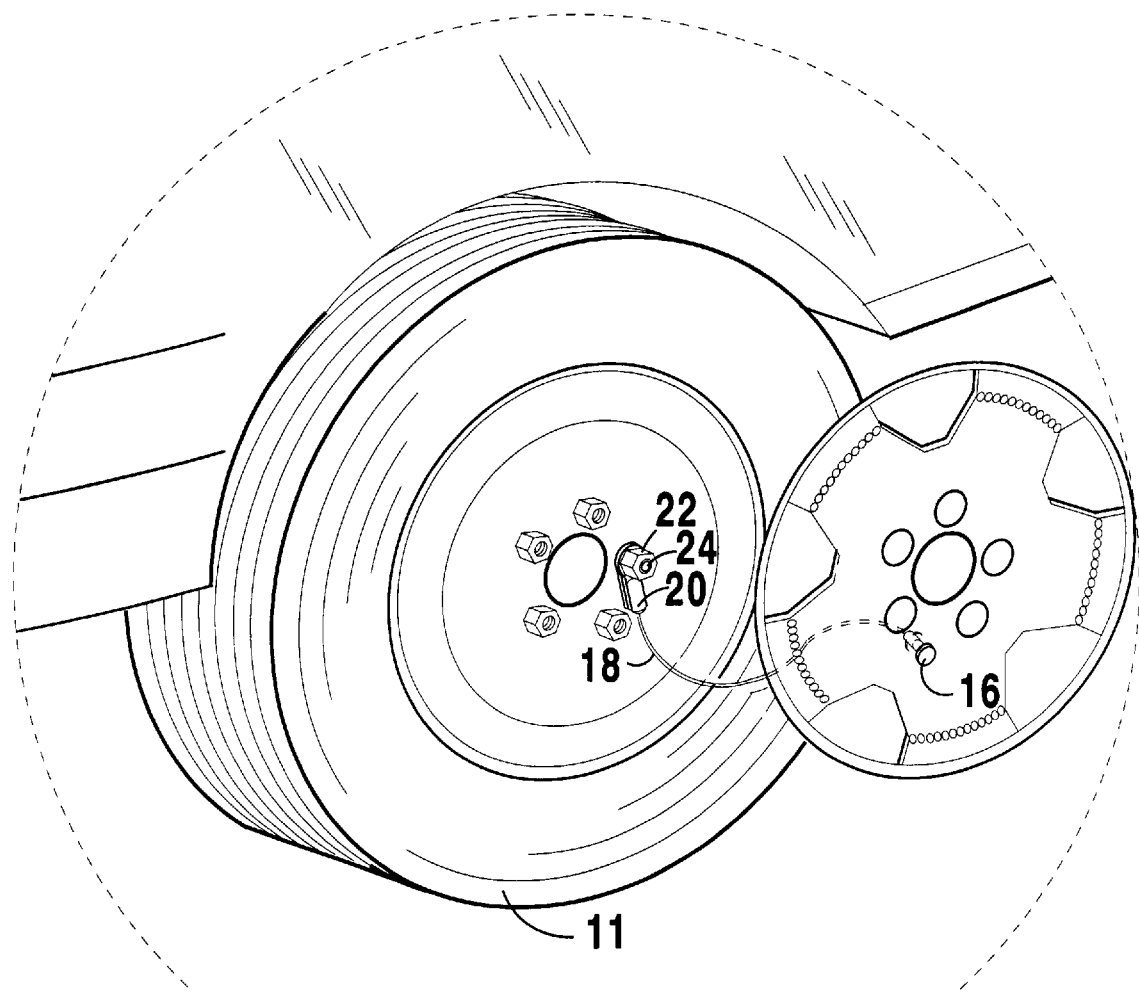
FIG. 2 is an enlarged view of the hubcap locking device showing the hubcap fitting, cable and annular fitting attached under the lug nut.

Turning to FIG. 2, therein is shown an enlarged view of the tire 11 and the hubcap locking device showing the cap-like wheel cover fitting 16, the flexible cable 18, and the annular fitting 20 on the end of the cable 18 attached to the lug nut 22 of the tire 11. The fitting 20 has an aperture (not shown) adapted to receive the wheel lug 24.

Figure 3:
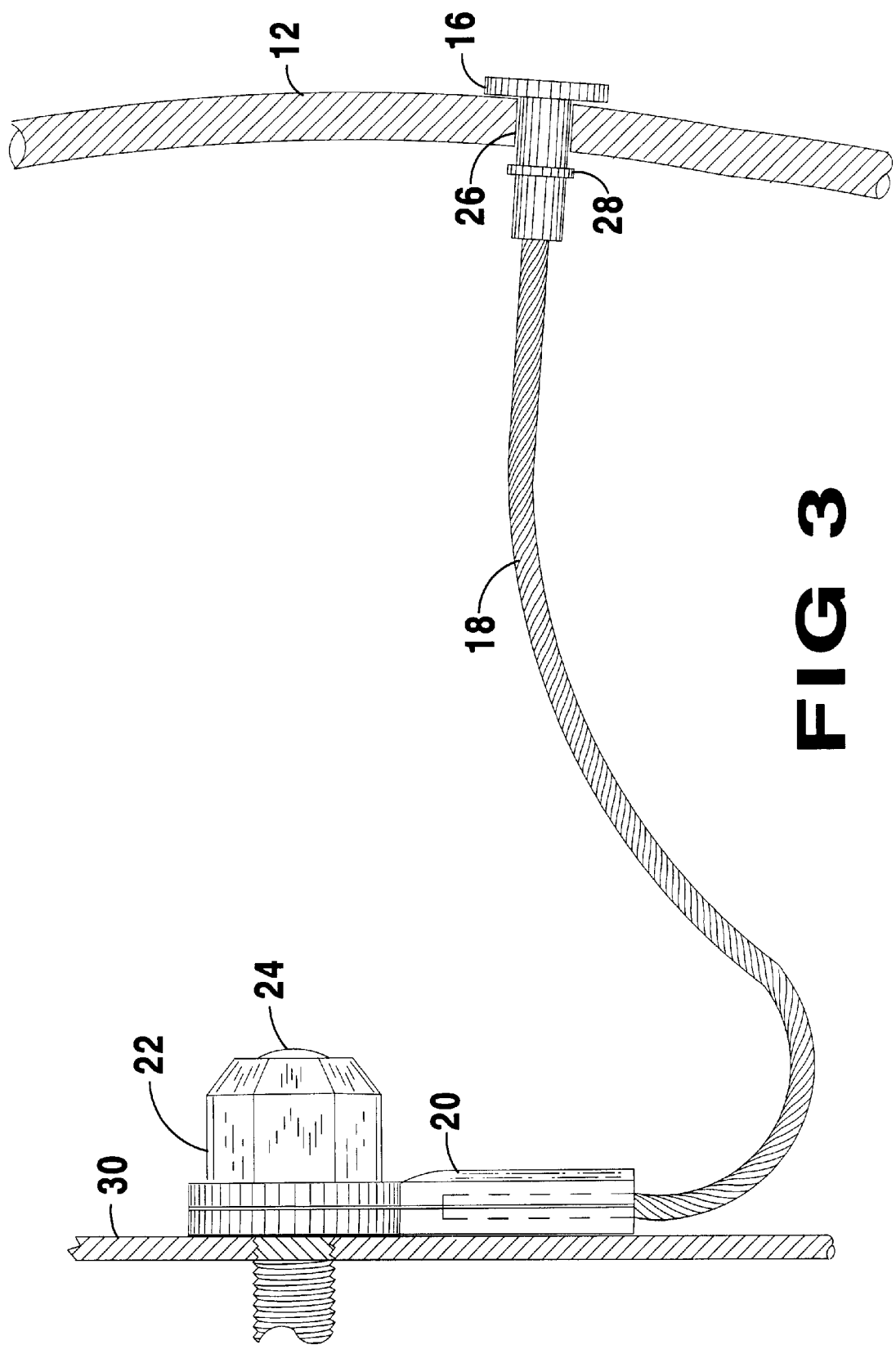
FIG. 3 is a side view of the hubcap locking device showing the cable means of attachment at each distal end.

Turning to FIG. 3, therein is shown a side view of the present invention showing the hubcap cap-like fitting 16, the flexible cable 18, along with the attaching means 20 for connecting the cable 18 to the wheel lug 24. Also shown therein is the lug bolt 22. Shown therein is the hubcap 12 having the hubcap fitting 16 passing therethrough by means of an aperture 26 in the wheel cover 12. Shown also is the hubcap fitting 16 having a locking c-ring on its inner side 28 for securing it to the hubcap 12 and an enlarged head having a diameter larger than the diameter of the aperture 26 so that the head will not pass through the aperture. Note that the cable connects to the fitting 16 in the standard manner. The fitting 28 is adapted to hold the hubcap fitting 16 to the hubcap 12 being secured to the hubcap so as not to allow the fitting 16 to pass through to the outside of the hubcap 12. The annular lug nut attachment 20 fits on the wheel lug 24 between the wheel 30 and the lug nut 22.

Figure 4:
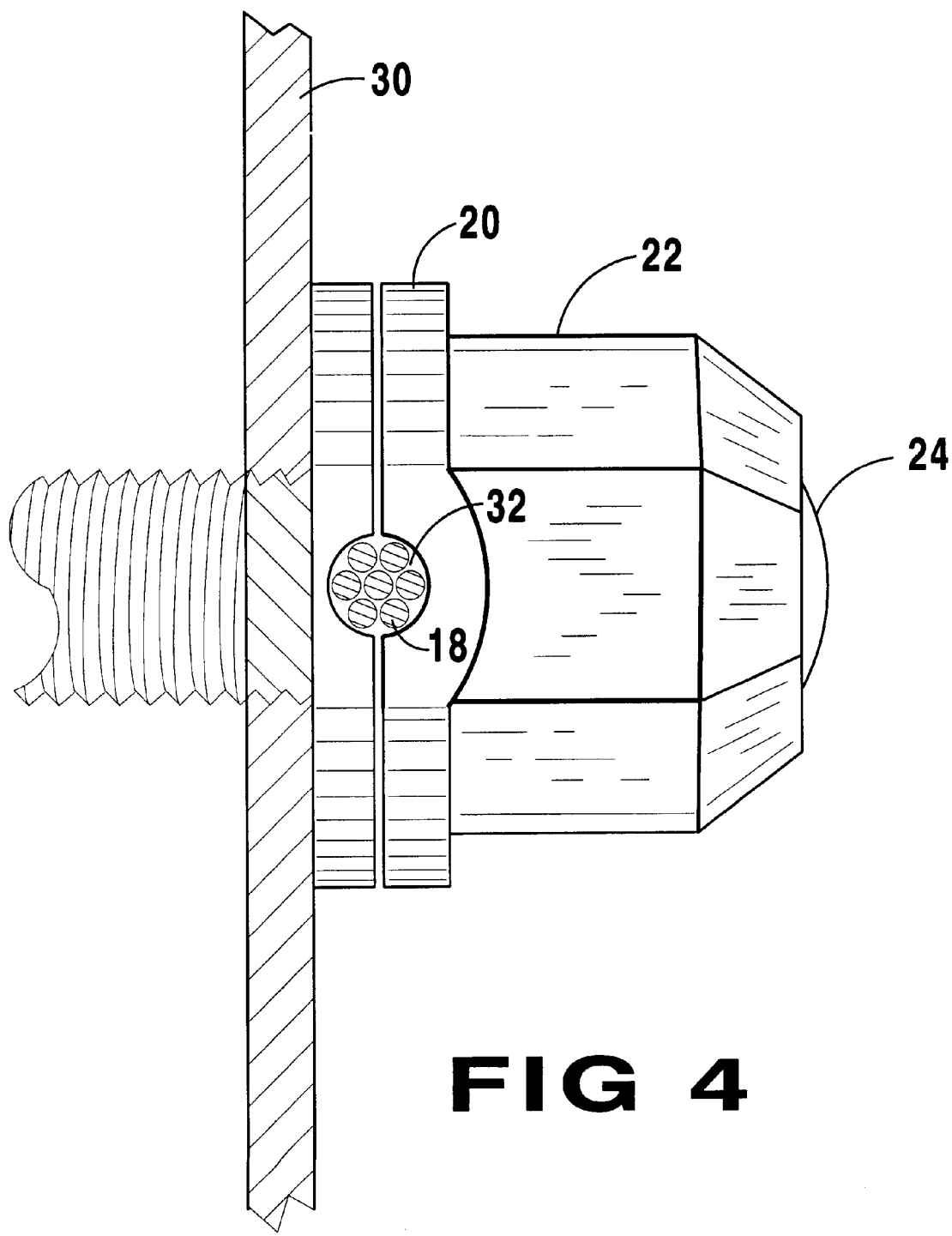
FIG. 4 is an enlarged side view of the wheel bolt, wheel cover, annular ring holding the cable, and the lug nut.

Turning to FIG. 4, therein is shown an enlarged side view of the wheel lug 24, the lug nut 22, the annular wheel lug attachment 20, and the wheel 30 of the tire 11 (not shown). The flexible cable 18 has attaching means 32 to be attached to the annular lug nut attachment 20.

Figure 5:
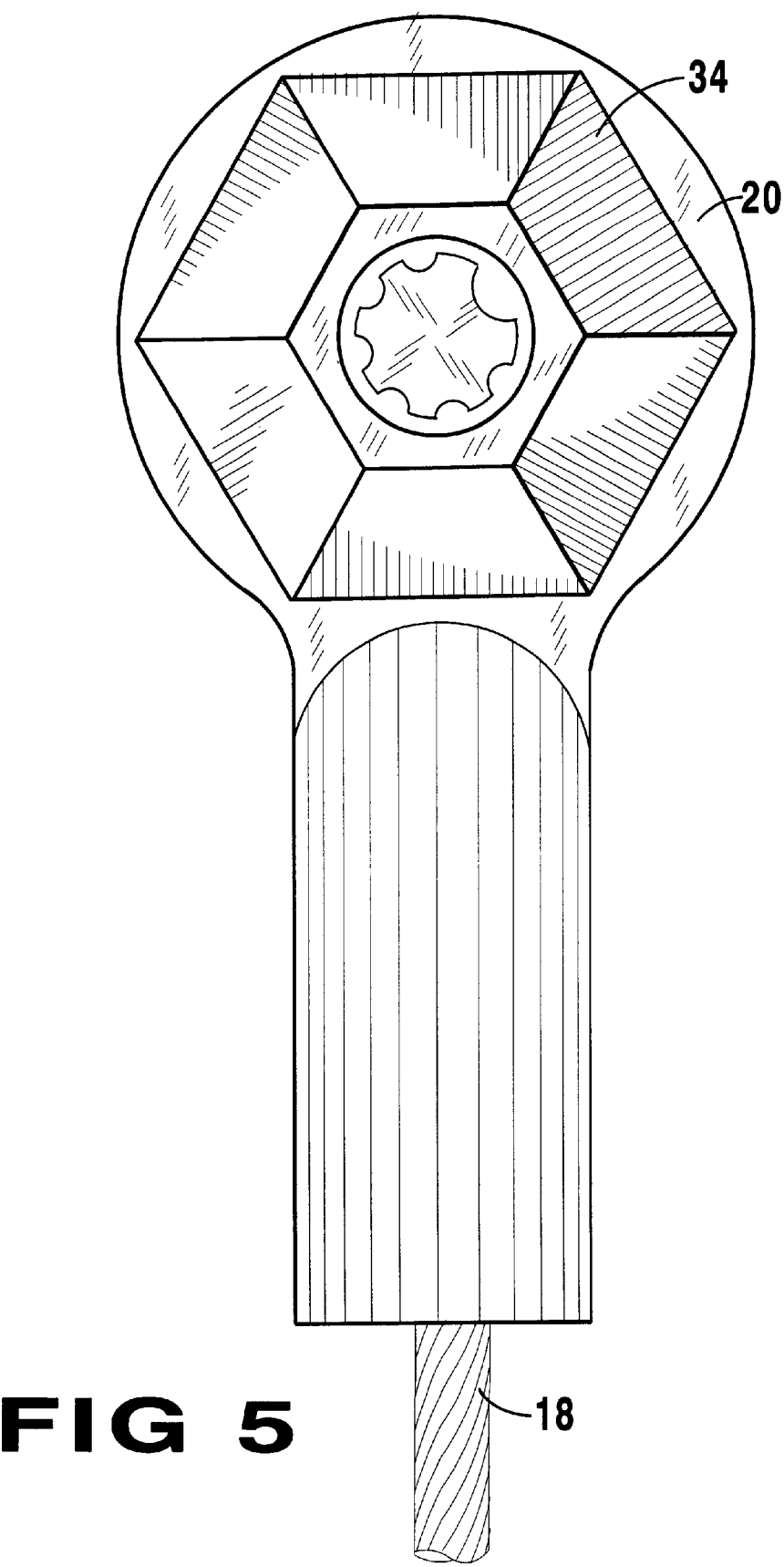
FIG. 5 is a top view of one type of locking lug nut which use a special key to release the lug nut which would provide additional security to the present hubcap locking device.

Turning to FIG. 5, therein is shown a top view of one type of locking lug nut 34 which uses a special key (not shown) to release the lug nut 34 which provides additional security to the present hubcap locking device. Also shown therein is the annular lug nut attachment 20 along with the flexible cable 18. This type of locking lug nut or other type of automatic lug nut releasing means which is of the standard type would be acceptable.

What is claimed is new and desired to be protected by Letters Patent as set forth in the claims:

1. An apparatus for securing a wheel cover to a wheel, comprising:
    (a) a flexible cable;
    (b) a first means for attaching one end of said cable to a wheel cover comprising a means for extending said first means through an aperture in said wheel cover and includes an enlarged head on the outside of said wheel cover;
    (c) a second means for attaching the opposite end of said cable to a wheel of an automobile whereby the wheel cover is secured to the automobile; and
    (d) said means for extending said first means through said aperture in said wheel cover further comprises a locking c-ring on the inside of said wheel cover.

2. The apparatus of claim 1, wherein said second means for attaching the opposite end of said cable to a wheel of an automobile further comprises an annular terminal adapted to receive the wheel lug of the wheel.

3. An apparatus for securing a wheel cover, comprising:
    (a) a flexible cable;
    (b) a first end of said cable being attached to and passes through the wheel cover;
    (c) a second end of said cable being attached to the wheel lug of the automobile wheel;
    (d) said second end of said flexible cable having an annular fitting attached thereto;
    (e) said annular fitting being attached to said lug bolt using a lug nut;
    (f) said first end of said cable further comprises an enlarged head on the outside of said wheel cover and is secured to the wheel cover of the car whereby the wheel cover is secured to the lug nut and theft of the wheel cover is prevented; and
    (g) said first end of said cable further comprises a locking c-ring on the inside of said wheel cover.

4. The apparatus of claim 3, wherein said lug nut further comprises a locking lug nut having a special key for being released from said wheel lug.

5. The apparatus of claim 2, wherein said annular terminal adapted to receive said wheel lug of said wheel further comprises a locking lug nut having a special key for being released from said wheel lug.

* * * * *